United States Patent Office 3,325,388
Patented June 13, 1967

3,325,388
PHOTOCHEMICAL PROCESS FOR THE
PRODUCTION OF AMIDES
Dov Elad, Rehovoth, and Yehoshua Rokach, Tel-Aviv,
Israel, assignors to Yeda Research and Development
Co., Ltd., Rehovoth, Israel, a company of Israel
No Drawing. Filed Oct. 23, 1965, Ser. No. 504,118
Claims priority, application Israel, Nov. 19, 1962,
18,253
10 Claims. (Cl. 204—162)

This application is a continuation-in-part of copending application Ser. No. 307,358 filed Sept. 9, 1963, now abandoned.

This invention relates to a process for the amidation of unsaturated compounds, and more particularly of 1:1 adducts of formamide with various olefinically unsaturated compounds.

The addition of formamide to olefins in the presence of peroxides and at elevated temperatures has been described in the literature; see, for example, U.S. Patent 2,745,853 of May 15, 1956, and Reiche et al., Agnew. Chemie, 73, 621 (1961). Such reactions are, however, like many peroxide-catalyzed reactions conducted at elevated temperatures, relatively hazardous to carry out.

It is accordingly among the objects of the present invention to provide a process for the carboxylation of olefinically unsaturated materials, which may be carried out under relatively mild ambient conditions.

A further object of the invention is to provide such a process which can be initiated photochemically to provide readily recoverable, crystalline 1:1 adducts of the unsaturated materials reacted.

Other objects and advantages of the invention will be apparent from the consideration of the following detailed description of several preferred embodiments thereof.

It has been found, in accordance with the process of the present invention, that the amidation of unsaturated compounds may be directly effected by exposure of a mixture of formamide and the unsaturated compound to ultraviolet irradiation (provided either by sunlight or artificial light sources), the mixture irradiated being substantially free of peroxide catalyst and containing from about 3 to 200 parts of the formamide per part of the olefinic compound. The relative amounts of the respective reactants given above, or otherwise referred to hereinafter, are expressed in terms of molar proportions, unless otherwise indicated.

There may thus be produced a wide variety of adducts of the amide and the several olefinic compounds. Various of such adducts are useful per se, e.g., adipamide, and others may be employed as intermediates in the synthesis of a wide variety of amines by subsequent reduction or by use of the Hoffman degradation reaction.

The addition of formamide to such unsaturated materials results primarily in the formation of 1:1 adducts by anti-Markovnikov addition. In the case of reaction with terminal olefins the following reaction thus predominates:

(1) 

on the other hand, in the case of additions to non-terminal olefins, isomeric mixtures of the two possible 1:1 adducts are principally formed:

(2) 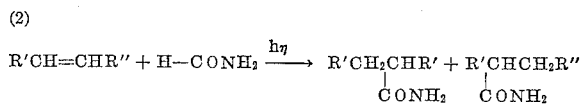

The R' and R'' substituents may comprise a wide variety of alkyl, ester, amido or like radicals as set forth more particularly hereinafter.

The addition of formamide to 1-heptene, for example, results in the formation of octanamide, in accordance with Equation 1; whereas the addition of formamide to 2-heptene results in mixtures of 2-heptanamide (2 parts) and 2-ethylhexanamide (1 part), in accordance with Equation 2. Similarly, while methyl 10-undecylenate and 10-undecylenamide react to form methyl 11-carbamoylundecanoate and dodecanediamide, respectively, methyl oleate and oleamide react to principally form mixtures of carbamoyl esters and diamides, respectively.

A wide variety of unsaturated compounds may be subjected to photochemical carboxylation in accordance with the process hereof. Substances which may be so reacted include:

(a) the olefinically unsaturated hydrocarbons, e.g., ethylene, propylene, 1-butene, 2-butene, cyclobutene, isobutene, 1-pentene, cyclopentene, cyclopentadiene, dicyclopentadiene, 1-hexene, cyclohexene, methyl cyclohexene, 1-heptene, 2-heptene, 1-octene, 2-octene, cyclooctadiene, limonene, nonene, decene, undecene, dodecene, allene (propadiene), 1,3-butadiene, 2-methyl-1,3-butadiene, 2,3-dimethyl-1,2-butadiene, natural rubber, pinene, vinyl pyridine, piperylene, styrene, methyl styrene, allyl benzene, diallyl benzene, 4-vinyl-cyclohexene, 1,5-hexadiene, 2,5-dimethyl-1,5-hexadiene, norbornadiene, and unsaturation-containing homopolymers and copolymers thereof;

(b) olefinically unsaturated alcohols, e.g., allyl alcohol, methallyl alcohol, 2-chlorallyl alcohol, 2-hydroxymethallyl alcohols, ethallyl alcohol, crotyl alcohol, 3-butenol, 4-pentenol, 10-undecylenyl alcohol, and geraniol;

(c) ethers of the olefinically unsaturated alcohols, e.g., vinyl methyl ether, vinyl ethyl ether, divinyl ether, methyl isopropenyl ether, vinyl n-butyl ether, vinyl phenyl ether, allyl ethyl ether, allyl octyl ether, allyl p-chlorophenyl ether, allyl p-methoxyphenyl ether, methallyl phenyl ether, 2-chlorallyl ethyl ether, diallyl ether, dimethallyl ether, 2-allyloxyethanol, methyl undecylenyl ether, methyl geranyl ether, vinyl chloroethyl ether, and the analogous thioethers;

(d) esters of the olefinically unsaturated alcohols and mono- and poly-basic, saturated and ethylenically unsaturated acids, e.g., vinyl acetate, vinyl n-butyrate, vinyl benzoate, isopropenyl acetate, allyl acetate, allyl propionate, triallyl borate, triallyl phosphate, allyl diethyl phosphate, diallyl oxalate, diallyl phthalate, allyl undecylenate, allyl ethyl sulfate, allyl dodecyl sulfide, and methallyl acetate;

(e) olefinically unsaturated acids and hydrolyzable derivatives thereof, including nitriles, esters, chlorides, anhydrides and amides, such as methyl acrylate, ethyl acrylate, acrylonitrile, acrylic acid, methacrylic acid, crotonic acid, acrylyl chloride, acrylamide, methacrylamide, crotonic acid amide, oleic acid amide, methyl fumarate, diethyl fumarate, methyl maleate, maleic anhydride, and diethyl 2-isobutenyl phosphonate, and including those olefinic acids and their hydrolyzable derivatives which are devoid of alpha-ethylenic linkages, e.g., 2-butenonitrile, 4-pentenoic acid, oleic acid, methyl oleate, oleamide, linoleic acid, undecylenic acid, methyl undecylenate and beta-hydromuconic acid; and (f) olefinically unsaturated aldehydes, e.g., acrolein, methacrolein, and crotonaldehyde, and olefinic ketones, e.g., vinyl methyl ketone, methyl isopropenyl ketone, butyl vinyl ketone, phenyl vinyl ketone and allyl methyl ketone.

Preferably, however, the reactant is selected from the following specific classes of compounds:

(1) mono-olefinically unsaturated acyclic compounds of the formula $RR_1C=CR_2R_3$, wherein R, $R_1$, $R_2$, and $R_3$ are each hydrogen, alkyl having from 1 to 10 carbon atoms, or aryl; or in which one of such substituents may be —COOH, —COOR$_4$, or —CONH$_2$, R$_4$ being alkyl having from 1 to 4 carbon atoms, and the remaining substituents are hydrogen or alkyl, as aforesaid; or in which $R_2$ and $R_3$ may form part of a 6-membered ring;

(2) mono-olefinically unsaturated cyclic compounds having the formula

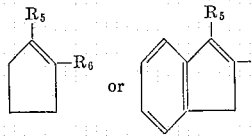

wherein $R_5$ is hydrogen or methyl, $R_6$ is hydrogen or alkyl having from 1 to 4 carbon atoms, and $n$ is 1, 2 or 3;

(3) di-olefinically unsaturated cyclic compounds of the formula

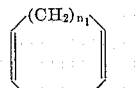

wherein $n_1$ and $n_2$ may each be 0, 1, or 2, and may be the same or different;

(4) vinylcyclohexene; and
(5) aromatic compounds of the formula

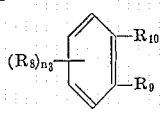

wherein $R_8$ is hydrogen or alkyl having from 1 to 4 carbon atoms, $R_9$ and $R_{10}$ are each hydrogen or may be part of a benzene ring, and $n_3$ is an integer of from 1 to 4.

The amidation reaction is desirably carried out in the presence of a photosensitizer which, it has been found, provides increased yields of the desired 1:1 adduct products. While it is preferred to use acetone as such photosensitizer, the photochemical reaction may also be sensitized by incorporating benzophenone, acetophenone or benzaldehyde in the reaction medium.

The formamide, the unsaturated compound, and the photosensitizer may be reacted in a wide range of proportions. Hence, from about 1 to 200, preferably from about 3 to 18 moles, of the formamide may be reacted per mole of the unsaturated compounds of classes (1)–(6), above. The amount of the photosensitizer employed in such reaction medium varies even more widely, desirably from about 0.1 to as much as 30 moles of the sensitizer being reacted per mole of the unsaturated compounds.

While the reaction between formamide and various of such compounds, particularly the mono-unsaturated acyclic materials of class (1), may be carried out in the absence of a photosensitizer, it is necessary to utilize such reagent in the reaction between formamide and the aromatic compounds of class (6) above. In such instance, at least 0.5 mole of the photosensitizer must be incorporated in the reaction medium per mole of the aromatic reactant, it being permissible to employ the photosensitizer in amounts as high as about 100 moles per mole of the aromatic compound. It will be understood that, when such excess quantities of sensitizer are utilized, it acts as a solvent for the reaction mixture as well.

The formamide and unsaturated compounds are reacted by ultraviolet irradiation, provided either by exposure of the reaction mixture to sunlight or, alternatively, by exposure to an artificial light source, e.g., a mercury vapor lamp. The reaction may be carried out at any desired temperature, ordinary ambient temperatures of the order of 20°–30° C. being effective.

Preferably, the reaction mixture is maintained during at least a portion of the irradiation in an inert atmosphere of, for example, nitrogen, to exclude oxygen therefrom. The mixture may also be agitated during the reaction to insure homogeneity.

Upon completion of the reaction excess reagents may be removed by conventional procedures, e.g., distillation under reduced pressures, and the carboxylated materials thereafter separated by chromatographic or other suitable operations.

The following examples are given to illustrate preferred procedures for carrying out the process of the present invention, it being intended that the invention should not be construed as restricted to such embodiments.

*Example 1.—Octanamide from 1-heptene in artificial light*

A mixture of 1-heptene (0.5 g.), formamide (40 g.), t-butyl alcohol (35 ml.), and acetone (5 ml.) was irradiated with a high pressure mercury vapor lamp for 45 minutes. The lamp was immersed in the reaction mixture, which was externally cooled to maintain a temperature of 30°–32° C. therein. Oxygen-free nitrogen was passed through the mixture throughout the irradiation.

A solution of 1-heptene (4.4 g.), t-butyl alcohol (10 ml.), and acetone (7 ml.) was then added in ten equal portions at 45-minute intervals, and the irradiation was continued for another 6 hours. After removal of the solvents, formamide was distilled from the mixture at 0.2 mm. Treatment of the residue with acetone and filtration (to remove traces of oxamide), followed by the removal of the solvent and addition of water, led to an oily mixture which was crystallized from acetone petroleum ether to give 3.2 g. of octanamide, M.P. 98–103° C. An authentic sample prepared for comparative purposes had a melting point of 105–106° C.

*Example 2.—Octanamide from 1-heptene in sunlight*

A mixture of 1-heptene (1 g.), formamide (40 g.), t-butyl alcohol (20 ml.), and acetone (5 ml.) was left in direct sunlight for one day. A solution of 1-heptene (3.9 g.), t-butyl alcohol (25 ml.), and acetone (5 ml.) was then added in four equal portions at 1-day intervals, and the solution was left in sunlight for another 2 days. The reaction products were separated according to the procedure described in Example 1.

Treatment of the oily residue with acetone-petroleum ether gave 3.23 g. of crude octanamide, M.P. 82–90°. Crystallization from acetone-petroleum ether gave a pure sample, M.P. 103–105° C.

Chromatography of the residue (2.50 g.) from the combined mother liquors on alumina (120 g.) and elution with acetone-petroleum ether (1:9) produced a mixture of telomers (450 mg.), a 2:1 telomer (400 mg.), 2-methylheptanamide (310 mg.), octanamide (620 mg.), and a glassy oil (680 mg.).

Octanamide (250 mg.), 2-decanone (950 mg.), and 2-methylnonan-2-ol (80 mg.) were isolated from the recovered formamide distillate.

*Example 3.—Methylhexanamide from propylene in sunlight*

A mixture of propylene (3.5 ml. as liquid), formamide (40 g.), t-butyl alcohol (25 ml.), and acetone (15 ml) was left in direct sunlight in a sealed Pyrex tube for one week. After treatment as in Example 1, an oil (1.1 g.) was obtained, which was chromatographed on alumina (55 g.) to yield 360 mg. of crude 3-methylhexanamide, M.P. 55–60° C. Crystallization from acetone-petroleum ether gave a pure sample, M.P. 96–97° C., and 130 mg. of crude butyramide, which was sublimed on a steam bath and showed M.P. 114–116° C.

*Example 4.—Heptanamide from 1-hexene in sunlight*

Heptanamide (1.31 g.), M.P. 98–100° C. (acetone-petroleum ether) was obtained from 4.2 g. of 1-hexene by reaction in direct sunlight. The residue from the combined mother liquors was chromatographed and yielded heptanamide (1.3 g.), a mixture of telomers (800 mg.), a 2:1 telomer (510 mg.), M.P. 67–68° C. (n-pentane), and a glassy oil (720 mg.). Analysis of the 2:1 telomer gave the following:

Calculated for $C_{13}H_{27}NO$: C, 73.18; H, 12.76; N, 6.57; mol. wt., 213. Found: C, 73.00; H, 12.78; N, 6.40; mol. wt., 206.

The analysis of the glassy oil was as follows: Found: C, 64.21; H, 11.60; N, 7.68.

An additional 600 mg. of heptanamide was also obtained from the recovered formamide distillate.

*Example 5.—Nonanamide from 1-octene in artificial light*

A cylindrical glass vessel was charged with a solution of 45 g. formamide and 4 g. 1-octene in 60 ml. dry t-butanol. A Hanau Q–81 high pressure mercury vapor lamp was immersed in the vessel.

The reaction was carried out for 45 hours under irradiation while the reaction mixture was simultaneously cooled by an external water cooler and agitated by bubbling nitrogen therethrough. The solvent and unreacted 1-octene were removed under reduced pressure (water pump) and excess formamide was removed at 1.5 mm. Hg up to 72–74° C. Water was added to the residue, resulting in the precipitation of crude nonanamide. A total quantity of 1.4 g. nonanamide, M.P. and mixed M.P. 99–100° C., was obtained.

*Example 6.—Nonanamide from 1-octene in artificial light*

The procedure described in Example 1 was repeated, using 5.6 g. of 1-octene as the olefinic reactant. There was thus formed 2.9 g. of crude nonanamide, M.P. 82–86° C. Crystallization from acetone-petroleum ether gave a pure sample, M.P. 99–100° C. Additional nonanamide was produced by chromatography of the residue from the mother liquors and by isolation from the recovered formamide distillate.

*Example 7.—Nonanamide from 1-octene in sunlight*

The procedure described in Example 2 was repeated, employing 5.6 g. of 1-octene as the olefinic reactant and irradiating the reaction mixture with direct sunlight as more fully described in such example. The crude nonanamide obtained (3.75 g.) melted at 92–96° C. The residue from the mother liquors was chromatographed on alumina to yield a mixture of telomers (100 mg.), a 2:1 telomer (430 mg.), 2-methyloctanamide (400 mg.), nonanamide (1 g.), and a glassy oil (840 mg.).

Nonanamide (150 mg.), 2-undecanone (530 mg.), and 2-methyldecan-2-ol (170 mg.) were isolated from the recovered formamide distillate.

*Example 8.—Nonanamide from 1-octene in artificial light*

A mixture of 1-octene (5.6 g.), formamide (40 g.), and t-butyl alcohol (55 ml.) was irradiated for 44 hours, employing a quartz immersion tube as the U.V. radiation source. 400 mg. of crude nonanamide, M.P. 90–92° C. was separated from the reaction mixture.

The residue from the mother liquors (2.6 g.) was chromatographed on alumina (130 g.) to yield a telomer mixture (1.0 g.), a 2:1 telomer (350 mg.) which was identical with the 2:1 telomer obtained in Example 6, nonanamide (710 mg.), and an oil (460 mg.) which had the following analysis:

Found: C, 69.45; H, 11.48; N, 7.05.

*Example 9.—Undecanamide from 1-decene in artificial light*

The procedure described in Example 5 was repeated, employing 45 g. formamide and 5 g. of 1-decene, but without t-butanol. A yield of about 30% (calculated on 1-decene) of undecanamide, M.P. and mixed M.P. 99–100° C., was obtained.

*Example 10.—Undecanamide from 1-decene in artificial light*

A reaction vessel was charged with 40.5 g. formamide, 1.0 g. 1-decene, 20 ml. t-butanol and 10 ml. acetone. Irradiation was commenced, employing a Q–81 Hanau mercury lamp fitted into a Pyrex immersion tube. After one hour, addition of a solution consisting of 6 g. 1-decene, 20 ml. t-butanol and 10 ml. acetone was begun, the solution being added during a 9-hour period while continuing to irradiate the reaction mixture. After the 9-hour period, irradiation was continued for an additional 3 hours. Nitrogen was bubbled through the reaction mixture during the reaction.

After solvent removal and distillation of residual formamide, the residue was treated with acetone-petroleum ether, yielding 5.4 g. undecanamide. A further crop of 0.64 g. of such product was obtained from the mother liquor by chromatography on alumina. The yield, calculated on 1-decene, was 65%.

*Example 11.—Undecanamide from 1-decene in artificial light*

Seven grams of 1-decene was reacted in the manner described in Example 1. There was thus produced 5.45 g. of crude undecanamide, M.P. 80–85° C. Crystallization from acetone-petroleum ether gave a pure sample, M.P. 99–100°. Further amounts of undecanamide were produced by chromatography and subsequent precipitation from pentane, and by isolation from the recovered formamide distillate.

*Example 12.—Dodecanedioic acid amide from undecylenic acid in artificial light*

A cylindrical glass vessel was charged with 100 g. formamide and 10 g. undecylenic acid. A Hanau Q–81 quartz lamp was immersed in the vessel.

The reaction mixture was irradiated for 20 hours, with external cooling and with magnetic stirring. At the end of this period, excess reagents were removed at reduced pressure (to 64° C. at 0.5 mm. Hg). The residue was treated with an acetone-petroleum ether mixture and there was obtained dodecanedioic acid amide, M.P. 132–134° C., after recrystallization from aqueous ethanol.

Hydrolysis of the product with aqueous ethanolic potassium hydroxide gave dodecanedioic acid. Reaction with ethereal diazomethane in methanol at 0° C. yielded dodecanedioic acid methyl ester amide, M.P. and mixed M.P. 97–98° C.

*Example 13.—1:12 dodecanediamide from undecylenamide in sunlight*

A reaction vessel was charged with 40.5 g. formamide, 2 g. undecylenamide, 25 ml. t-butanol and 5 ml. acetone. The vessel was tightly stoppered under nitrogen and left in direct sunlight for 2 days. A solution of 7.15 g. undecylenamide, 20 ml. t-butanol, and 5 ml. acetone was added in five equal portions at intervals of two days, during which time the irradiation was continued. After continuing the irradiation for an additional 3 days, precipitated 1:12-dodecanediamide (9.0 g.) was filtered off and an additional crop of 1.4 g. of the amide obtained from the filtrate. The yield, calculated on undecylenamide was 90%.

*Example 14.—Methyl 11-carbamoylundecanoate from methyl 10-undecylenate in artificial light*

The general procedure described in Example 1, using 9.9 g. of methyl 10-undecylenate, was followed and led to 3.9 g. of crude methyl 11-carbamoylundecanoate, M.P. 92–95° C. Crystallization from acetone-petroleum ether gave a pure sample, M.P. 96–98° C.

*Analysis.*—Calculated for $C_{13}H_{25}NO_3$: C, 64.16; H, 10.36; N, 5.76. Found: C, 64.17; H, 10.28; N, 5.89.

The product gave dodecanedioic acid upon alkaline hydrolysis.

Example 15.—Adipamide from 4-pentenamide in sunlight

A mixture of 4-pentenamide (1 g.), formamide (40 g.), t-butyl alcohol (20 ml.), and acetone (5 ml.) in a Pyrex conical flask stoppered under nitrogen was left in direct sunlight. Precipitation of the product started at the end of the second day. Commencing after the second day, a solution of 4-pentenamide (4 g.), t-butyl alcohol (50 ml.) and acetone (5 ml.) was added in five equal portions at 2-day intervals, the mixture being left in the sunlight for 2 days more.

The precipitate was washed with hot acetone to yield 4.4 g. of adipamide, M.P. 210–215° C. Crystallization from ethanol gave a pure sample, M.P. 224–226° C.

Formamide was removed from the filtrate in the usual way. Treatment of the residue with acetone-ethanol led to the isolation of an additional crop (1.17 g.) of adipamide.

Example 16.—Methyl 5-carbamoylpentanoate from methyl 4-pentenoate in artificial light Methyl 4-pentenoate (5.7 g.) was reacted with formamide, employing the proportions and reaction conditions described in Example 1. A saturated aqueous sodium chloride solution was added to the residue obtained, leading to the formation of 3.25 g. of crude methyl 5-carbamoylpentanoate, M.P. 82–88° C. Crystallization from acetone-petroleum gave a pure sample, M.P. 94–96° C.

*Analysis.*—Calculated for $C_7H_{13}NO_3$: C, 52.81; H, 8.23; N, 8.80. Found: C, 52.85; H, 8.00; N, 8.86.

The product yielded adipic acid upon alkaline hydrolysis. The residue from the mother liquors was chromatographed on alumina to yield a mixture of telomers (660 mg., eluted with acetone-petroleum ether 3:7), methyl 5-carbamoylpentanoate (1.3 g., eluted with acetone-petroleum ether 1:1), and a glassy oil (1.03 g.) which showed the following analysis:

Found: C, 49.80; H, 7.78; N, 8.25.

Example 17.—Methyl 5-carbamoylpentanoate from methyl 4-pentenoate in sunlight A yield of 4.3 g. of crude methyl 5-carbamoylpentanoate, M.P. 84–91° C., was obtained by reaction of 5.7 g. of methyl 4-pentenoate in sunlight, as described in Example 2. Chromatography of the residue from the mother liquors led to an additional crop of methyl 5-carbamoylpentanoate (510 mg.).

Work-up of the recovered formamide distillate gave an oil (1.5 g.) from which methyl 7-oxoctanoate was isolated as its 2,4-dinitrophenylhydrazone derivative.

Example 18.—2-Methylbutyramide from cis-2-butene in sunlight

A mixture of cis-2-butene (2.82 g.; 4.4 ml. as liquid), formamide (40 g.), t-butyl alcohol (45 ml.) and acetone (7 ml.) was exposed to direct sunlight in a Pyrex sealed tube for 50 days. After solvent removal, formamide was distilled from the mixture at 0.2 mm. Hg, and the residue treated with a saturated aqueous solution of NaCl and extracted with chloroform. There remained a residue (1.6 g.) which was chromatographed on alumina (80 g.). Acetone-petroleum ether (3:17) eluted 600 mg. of 2-methylbutyramide, M.P. 111–112° C. (acetone-petroleum ether).

Example 19.—2-methylbutyramide from trans-2-butene in sunlight

The procedure described in Example 18 was repeated, using 2.82 g. of trans-2-butene as the olefinic reactant. 2.83 g. of 2-methylbutyramide was thus produced.

Example 20.—2-ethylhexanamide and 2-methylheptanamide from 2-heptene in artificial light A mixture of 0.5 g. 2-heptene, 40 g. formamide, 35 ml. t-butyl alcohol and 5 ml. acetone was irradiated with UV light from an artificial light source for one hour. A solution of 4.4 g. 2-heptene, 10 ml. t-butyl alcohol and 3 ml. acetone was added in seven equal portions at one-hour intervals and irradiation was continued for a further 36 hours. After removal of the solvents, formamide was distilled off at 0.2 mm. Hg pressure, and the residue was treated with saturated aqueous sodium chloride and extracted with chloroform.

Removal of the solvent left as a residue an oily substance which was chromatographed on 150 g. alumina. The weight of the oil was 2.85 g. Elution with a 1:9 acetone-petroleum ether mixture gave 630 mg. 2-ethylhexanamide, M.P. 101–103° C. (acetone-petroleum ether) and a 1.41 g. 2-methylheptanamide, M.P. 76–78° C. (n-pentane). Additional quantities of 2-ethylhexanamide (410 mg.) and 2-methylheptanamide (750 mg.) were recovered from the formamide distillate.

Example 21.—2-ethylhexanamide and 2-methylheptanamide from 2-heptene in sunlight A mixture of 40 g. formamide, 20 ml. t-butyl alcohol, 0.5 g. 2-heptene and 5 ml. actone was left in direct sunlight for 3 days. A solution of 4.4 g. 2-heptene, 20 ml. t-butyl alcohol, and 3 ml. actone was then added in equal portions at 5-day intervals, the resulting reaction mixture being left in direct sunlight for a further 2 weeks. 1.74 g. 2-ethylhexanamide and 3.24 g. 2-methylheptanamide were obtained by the chromatographic technique described in Example 20.

Example 22.—2-ethylhexanamide and 2-methylheptanamide from cis-2-heptene in artificial light The quantities and experimental conditions described in Example 20 were followed, utilizing a cis-2-heptene olefinic reactant. The residue (3.7 g.) obtained by the procedure outlined in such example was chromatographed on alumina (185 g.) to yield a mixture of telomers (430 mg.), 2-ethylhexanamide (830 mg.), 2-methylheptanamide (1.65 g.), and a polar oil (700 mg.).

4-methyl-2-nonanone (260 mg.), 4-ethyl-2-octanone (140 mg.), 2-ethylhexanamide (420 mg.) and 2-methylheptanamide (800 mg.), were obtained from the recovered formamide distillate.

Example 23.—2-ethylhexanamide and 2-methylheptanamide from cis-2-heptene in sunlight The procedure described in Example 21 was repeated with cis-2-heptene. Excess solvents were removed under water pump vacuum, and saturated aqueous sodium chloride solution was then added to the residue, followed by extraction with chloroform. Removal of the chloroform led to a residue (6.4 g.) which was chromatographed on alumina (320 g.) to yield 720 mg. of a mixture of 4-methyl-2-nonanone (460 mg.) and 4-ethyl-2-octanone (260 mg.) eluted with petroleum ether; a mixture of telomers (310 mg.), 2-ethylhexanamide (1.52 g.) and 2-methylheptanamide (3.35 g.) eluted with acetone-petroleum ether (1:19); and finally a polar oil (420 mg.) eluted with ethanol-acetone (3:7).

Example 24.—2-ethylhexanamide and 2-propylpentanamide from 3-heptene in artificial light The relative proportions of reactants and experimental conditions described in Example 20 were repeated, employing a 3-heptene reactant. Irradiation was continued for 60 hours. The residue (3.6 g.) obtained by the procedure described in such example was chromatographed on alumina (180 g.) to yield a mixture of telomers (220 mg.) and 2.72 g. of a mixture of 2-ethylhexanamide and 2-propylpentanamide, when eluted with acetone-petroleum ether (1:9). The mixture showed M.P. 94–100° C. Ethanol-acetone (2:3) eluted a polar oil (500 mg.).

Work-up of the recovered formamide led to a residue (1.7 g.) which was chromatographed on alumina (85 g.) to yield 150 mg. of a mixture of 4-ethyl-2-octanone (90 mg.) and 4-propyl-2-heptanone (60 mg.) when eluted with petroleum ether, and a mixture of 2-ethyl-hexanamide and 2-propylpentanamide (1.19 g.) when eluted with acetone-petroleum ether (1.9).

*Example 25.—2-ethylheptanamide and 2-propylpentanamide from 3-heptene in sunlight*

3-heptane was reacted with formamide, employing the reactant proportions specified in Example 21. The reaction mixture was left in sunlight for 65 days and worked up in the manner described in Example 23. The residue (5.7 g.) was chromatographed on alumina (330 g.) to give 370 mg. of a mixture of 4-ethyl-2-octanone (220 mg.) and 4-propyl-2-heptanone (150 mg.), 500 mg. of a mixture of telomers, a mixture of 2-ethylhexanamide and 2-propylpentanamide (4 g.) and a polar oil (740 mg.).

*Example 26.—2-ethylheptanamide and 2-methyloctanamide from 2-octene in artificial light*

The general procedure described in Example 20 was followed using 5.6 g. of 2-octene. The residue (4.2 g.) was chromatographed on alumina (210 g.) to give a mixture of telomers (460 mg.), 2-ethylheptanamide (1 g.), M.P. 99–100° C. (acetone-petroleum ether), 2-methyloctanamide (2.21 g.), M.P. 80–81° C. (acetone-petroleum ether), and a polar oil (390 mg.).

A mixture of 690 mg. 4-methyl-2-decanone (490 mg.) and 4-ethyl-2-nonanone (200 mg.), 2-ethylheptanamide (390 mg.), and 2-methyloctanamide (820 mg.) was isolated from the formamide distillate.

*Example 27.—2-ethylheptanamide and 2-methyloctanamide from 2-octene in sunlight*

The procedure described in Example 21 using 5.6 g. of 2-octene was followed. The residue (5.4 g.) obtained by the treatment described in such example was chromatographed on alumina (270 g.) to give a mixture of telomers (160 mg.), 2-ethylheptanamide (1.5 g.), 2-methyloctanamide (2,94 g.), and a polar oil (800 mg.).

Workup of the recovered formamide distillate led to a residue (2.24 g.) which was chromatographed on alumina (120 g.) to yield 690 mg. of a mixture of 4-methyl-2-decanone (440 mg.) and 4-ethyl-2-nonanone (250 mg.), 2-ethylheptanamide (610 mg.), and 2-methyloctanamide (940 mg.).

*Example 28.—9- and 10-carbamoylstearamides from oleamide in sunlight*

A mixture of oleamide (2 g.), formamide (40 g.), t-butyl alcohol (25 ml.) and acetone (5 ml.) in a Pyrex conical flask stoppered under nitrogen was left in direct sunlight. A solid started to precipitate on the third day. After five days, a solution of oleamide (3.5 g.), t-butyl alcohol (15 ml.) and acetone (2 ml.) was added in five equal portions at 5-day intervals, and the mixture was left in sunlight for another two weeks. The precipitate was crystallized from ethanol to yield 1.25 g. of 9-carbamoyl-stearamide, M.P. 160–163° C. Recrystallization gave a pure sample, M.P. 166–167° C. (ethanol).

*Analysis.*—Calculated for $C_{19}H_{38}N_2O_2$: C, 69.89; H, 11.73; N, 8.58. Found: C, 69.73; H, 11.50; N, 8.47.

Formamide was removed from the filtrate, and the residue treated with saturated aqueous sodium chloride solution and extracted with chloroform. Removal of the solvent left a residue (4.8 g.) which was chromatographed on alumina (250 g.). Elution with acetone-petroleum ether (1:4) led to 1 g. of a solid whose infrared spectrum showed both a ketonic and a carbamoyl function. Ethanol-acetone (1:9) eluted a mixture of the diamides (3.4 g.), M.P. 135–144° C. (acetone-petroleum ether).

*Analysis.*—Calculated for $C_{19}H_{38}N_2O_2$: C, 69.89; H, 11.73; N, 8.58. Found: C, 69.59; H, 11.55; N, 8.90.

Thin layer chromatography (acetone-petroleum ether) showed two spots, one of which corresponded to 9- carbamoyl-stearamide. The mixture was chromatographed on kieselgel G and the first fractions eluded with ethanol-acetone (1:19) contained 10-carbamoylstearamide, M.P. 156–157° C. (acetone-petroleum ether).

*Analysis.*—Calculated for $C_{19}H_{38}N_2O_4$: C, 69,89; H, 11.73; N, 8.58. Found: C, 70.03; H, 11.59; N, 8.88.

The other fractions consisted of mixtures of the two diamides.

*Example 29.—Methyl 9-carbamoylstearate and methyl 10-carbamoylstearate from methyl oleate in artificial light*

Ten grams of methyl oleate (Fluka, 96%) was used in the reaction. The residue (10.5 g.), obtained by the procedure described in Example 20, was treated with a mixture of acetone-petroleum ether to give 3.75 g. of a mixture of the carbamoyl esters, M.P. 85–90° C. Crystallization from acetone-petroleum ether raised the M.P. to 98–100° C.

*Analysis.*—Calculated for $C_{20}H_{39}NO_3$: C, 70.33; H, 11.51; N, 4.10. Found: C, 70.61; H, 11.54; N. 4.50.

The solid was shown to consist of a mixture of methyl 9-carbamoylstearate and methyl 10-carbamoylstearate by comparison with an authentic mixture. The isomeric carbamoyl esters could not be separated on chromatography nor did they show any separation in thin layer chromatography. The respective diesters could not be separated by gas-liquid chromatography.

*Example 30.—Methyl-9-carbamoylstearate and methyl 10-carbamoylstearate from methyl oleate in sunlight*

Ten grams of methyl oleate (Fluka 96%) was used for this experiment. Treatment of such material in the manner described above led to 4.5 g. of a mixture of the carbamoyl esters, M.P. 95–98° C. Chromatography of the residue (7. g.) from the mother liquor on alumina (350 g.) led to 2.29 g. of unreacted starting material, a mixture of telomers (700 mg.), the carbamoyl esters (2.3 g.) and a polar oil (900 mg.).

*Example 31.—2-carbamoyl diethyl succinate from diethyl maleate in artificial light*

A mixture of 0.5 g. diethyl maleate, 240 g. formamide and 40 ml. t-butyl alcohol, together with 10 g. benzophenone, was irradiated for half an hour. A mixture of 2.5 g. diethyl maleate in 10 ml. of t-butanol was added over a half hour period and the mixture was irradiated for a further three hours. The precipitated benzpinacol was removed by filtration. The residue was separated and subjected to chromatography on alumina. 3.13 g. of 2-carbamoyldiethyl succinate, M.P. 77–78° C., was thus produced.

When a reaction mixture of the same composition was activated by sunlight, the same product was obtained in a yield of 90%. Similar results were obtained when acetone was employed as the photosensitizer, in lieu of benzophenone.

*Example 32.—2-carbamoyl diethyl succinate from diethyl fumarate in artificial light*

The reaction carried out in Example 35 was repeated, employing diethyl fumarate in place of the diethyl maleate reactant. The 2-carbamoyl diethyl succinate product was obtained in 85% yield. When the experiment was again repeated, employing acetone as the photosensitizer in place of benzophenone, similar results were obtained.

*Example 33.—Heptylsuccinic acid monoamide monomethyl ester from methyl 2-decenoate in artificial light*

A mixture of formamide (240 ml.), t-butyl alcohol (40-ml.), benzophenone (10 g.) and methyl 2-decenoate (0.5 g.) was irradiated for 30 minutes. A solution of methyl 2-decenoate (2.5 g.) in t-butyl alcohol (10 ml.) was added during a 30-minute period, and the combined mixture irradiated for an additional three hours. The precipitated benzpinacol was filtered off, the filtrate was treated with saturated sodium chloride solution, and extracted with chloroform. The residue left after removal of the solvent was chromatographed on "acid washed" alumina. Acetone-petroleum ether eluted heptyl succinic acid monoamide monomethyl ester (80% yield), M.P. 72–74° C.

Similar results were obtained when acetone was used as a photosensitizer in place of benzophenone.

*Example 34.—Cyclohexanecarboxamide from cyclohexene in artificial light*

4.1 g. of cyclohexene was reacted, employing the procedure described in Example 20. The reaction residue was treated with hot acetone to give 2.1 g. of cyclohexanecarboxamide, M.P. 176–182° C. Crystallization from acetone-petroleum ether gave a pure sample, M.P. 184–185° C.

*Example 35.—Cyclohexanecarboxamide from cyclohexene in sunlight*

The procedure of Example 21 was repeated, reacting 4.1 g. of cyclohexene. 1.7 g. of crude cyclohexane carboxamide, M.P. 174–182°, was thus produced. Chromatography of such material (2.76 g.) on alumina (140 g.) yielded a mixture of telomers (300 mg.), cyclohexanecarboxamide (1.77 g.), and a polar oil (610 mg.). Cyclohexylacetone (370 mg.) and cyclohexanecarboxamide (650 mg.) were obtained from the formamide distillate.

*Example 36.—Exo-cis-bicyclo (3,3,0)-octane 1-carboxamide from 1,5-cyclooctadiene in artificial light*

A mixture of 5.4 g. 1,5-cyclooctadiene, 40 g. formamide, 50 ml. t-butanol, and 8 ml. acetone was irradiated for 30 hours. Excess reagents were removed under reduced pressure and the residue was treated with water and extracted with chloroform. After removal of the solvent there remained a residue of 4.5 g. which was chromatographed on 230 g. alumina. A mixture of 1:5 acetone-petroleum ether eluted exo-cis-bicyclo-(3,3,0)-octane 1-carboxamide (1.9 g.), M.P. 174–176° C. (acetone).

*Analysis.*—Calculated for $C_9H_{15}NO$: C, 70.55; H, 9.87; N, 9.14. Found: C, 70.15; H, 9.71; N, 8.92.

*Example 37.—Trans-2-methylcyclohexane carboxamide from 1-methylcyclohexene in artificial light*

A mixture of formamide (55 g.) t-butyl alcohol (50 ml.) acetone (7 ml.), and 1-methylcyclohexene (0.8 g.) was irradiated for one hour. A mixture of 1-methylcyclohexene (4 g.) and acetone (5 ml.) was added in five portions at one-hour intervals, and the mixture was irradiated for an additional 36 hours.

The residue left after the post-irradiation treatment described in Example 20 was chromatographed on "acid washed" alumina. Acetone-petroleum ether (3:10) eluted trans - 2 - methylcyclohexanecarboxamide, M.P. 180–182° C.

*Example 38.—Cyclohexenyl 4-propionamide from 4-vinyl-cyclohexene in artificial light*

A mixture of 5.4 g. 4-vinyl-cyclohexene, 40 g. formamide, 50 ml. t-butanol and 8 ml. acetone was irradiated for ten hours. Excess reagents were removed under pressure and the residue was treated with a saturated aqueous solution of sodium chloride and extracted with chloroform. After removal of the solvent there remained a residue of 3.5 g. which was chromatographed on alumina. With acetone-petroleum ether (1:5) there was eluted cyclohexenyl 4-propionamide, M.P. 120–122° C. (acetone-petroleum ether).

*Analysis.*—Calculated for $C_9H_{15}NO$: C, 70.55; H, 9.87; N, 9.14. Found: C, 70.22; H, 9.85; N, 9.14.

Hydrogenation of the product over 10% Pd/C gave 3-cyclohexyl-propionamide, M.P. 119–121° C. (acetone-petroleum ether) which was found to be identical with an authentic sample.

*Example 39.—Norbornane-2-exo-carboxyamide from norbornene in artificial light*

A mixture of norbornene (0.7 g.), formamide (40 g.), t-butyl alcohol (35 ml.), and acetone (5 ml.), was irradiated for one hour. A solution of norbornene (4 g.), t-bnutyl alcohol (15 ml.), and acetone (3 ml.) was then added in seven equal portions at one-hour intervals, and the mixture was irradiated for a further four hours. Formamide was distilled from the mixture at 0.2 mm., and the residue treated with water. The resulting precipitate crystallized from acetone-light petroleum to yield norbornane-2-exo-carboxyamide (2 g.).

The aqueous solution was extracted with chloroform, the solvent removed, and the residue combined with that from the mother liquor and treated with a small volume of acetone-light petroleum to yield an additional crop (1.25 g.), M.P. 181–183° C. (from acetone-light petroleum). It did not depress the M.P. of the authentic amide, and had the same infrared spectrum.

*Example 40.—Norbornane-2-exo-carboxyamide from norbornene in sunlight*

A mixture of norbornene (1 g.), formamide (40 g.), t-butyl alcohol (25 ml.), and acetone (5 ml.) was left in direct sunlight for one day. A solution of norbornene (3.7 g.) in t-butyl alcohol (35 ml.) and acetone (4 ml.) was then added in four equal portions at one-day intervals, and the mixture was left in sunlight for a further three days. Further treatment in the manner described in Example 42 resulted in the formation of norbornane-2-exo-carboxyamide (3 g.), M.P. 181–183° C. (from acetone-light petroleum).

The residue from the extraction and mother liquor, on treatment with a little acetone, yielded an additional crop (1.5 g.), M.P. 173–177° C. Further amounts of the carboxyamide were produced from the residue from the mother liquor and the recovered formamide distillate. A total of 6 g. (87% based on norbornene) of norbornane-2-exo-carboxyamide was thus obtained.

*Example 41.—Norbornane-2-exo-carboxyamide from norbornene in artificial light*

A quartz immersion tube was used for this experiment. The general procedure described in Example 38 was followed, leading to norbornane-2-exo-carboxyamide (1.85 g.), M.P. 179–183° C., as the first crop. The residue from the mother liquors (2.6 g.) was chromatographed on alumina (130 g.), yielding: (a) a mixture of telomers (250 mg.), (b) a solid (300 mg.), M.P. 104–112° C. (from acetone-light petroleum) (found: C, 77.7; H, 10.0; N, 6.4; calculated for $C_{15}H_{23}NO$: C, 77.2; H, 9.9; N, 6.0 percent) which was probably a 2:1 telomer, (c) a 2:1 telomer (50 mg.) M.P. 172–174° C. (from acetone-light petroleum), which was identical with the 2:1 telomer isolated from the acetone-initiated reaction (mixed M.P. infrared spectra, and thin-layer chromatography), (d) norbornane-2-exo-carboxyamide (1.7 g.), and (e) a glassy oil (330 mg.). A total of 3.55 g. of norbornane-2-exo-carboxyamide (51%) was thus obtained. Longer irradiation periods led to increased yields of the amide (61% after 21 hours irradiation).

*Example 42.—Benzamide from benzene in artificial light*

A mixture of formamide (55 g.), benzene (20 ml.) and acetone (60 ml.) was irradiated for 45 hours. Excess reagents were removed under reduced pressure and the residue chromatographed on "acid washed" alumina. A mixture of alcohol-chloroform (1:19) eluted benzamide, M.P. 126–127° C.

Example 43.—p-Tolylacetamide from p-xylene in artificial light

A glass reaction vessel was charged with 45 g. formamide, 13 g. p-xylene and 75 ml. acetone, and the solution irradiated with a Hanau Q–81 mercury lamp for 70 hours, nitrogen being concurrently bubbled therethrough. Solvent and excess reagents were removed under reduced pressure and the residue treated with hot acetone and filtered off from oxamide.

Acetone was removed and the residue was taken up in chloroform and washed with saturated aqueous sodium chloride. The chloroformic solution was then dried over sodium sulfate and the solvent removed. The residue was subjected to chromatography on acid-washed alumina and eluted by means of a 1:1 petroleum ether-acetone mixture to produce 2.3 g. of p-tolylacetamide, M.P. 182–184° C.

Example 44.—o-Tolyl acetamide from o-xylene in artificial light

The procedure described in Example 42 was repeated, employing the same proportions of formamide, o-xylene and acetone. o-Tolyl acetamide, M.P. and mixed M.P. of 161–162° C., was thus produced.

Example 45.—m-Tolyl acetamide from m-xylene in artificial light

The procedure described in Example 42 was repeated, employing the same proportions of formamide, o-xylene and acetone. m-Tolyl acetamide, M.P. and mixed M.P. of 161–162° C., was thus produced.

Example 46.—1-naphthamide from naphthalene and formamide in artificial light A mixture of formamide (55 g.), naphthalene (4 g.) and acetone (55 ml.) was irradiated for 48 hours. Excess reagents were removed under reduced pressure and the residue was chromatographed on "acid washed" alumina. Acetone-petroleum ether (4:6) eluted 1-naphthamide.

Example 47.—2,2-dimethyl phenyl acetamide from cumene in artificial light

A mixture of formamide (67 g.), cumene (21 g.) and acetone (100 ml.) was irradiated for 48 hours. Excess reagents were removed under reduced pressure and the residue was treated with saturated aqueous sodium chloride solution and extracted with chloroform. Removal of the solvent left a residue which was chromatographed on "acid washed" alumina. Acetone-petroleum ether (4:3) eluted 2,2-dimethyl phenyl acetamide, M.P. and mixed M.P. 158–159° C.

It will be noted that, in accordance with the present invention, a process is provided for the carboxylation of amino acid materials by photochemical operations. Since various changes may be made in the preferred embodiments of such process described above without departing from the scope of the invention, it is intended that the preceding description should be construed as illustrative and not in a limiting sense.

We claim:

1. A process for the amidation of unsaturated compounds, which comprises exposing a mixture of formamide and a compound containing an unsaturated group C=C to ultraviolet irradiation, said mixture being substantially free of peroxide catalyst and containing from 1 to 200 moles of formamide per mole of said compound.

2. The process as defined in claim 1, in which the formamide is reacted with said compound in admixture with an acetone, benzophenone, acetophenone, or benzaldehyde photosensitizer, said photosensitizer being incorporated in the mixture in an amount of at least 0.1 mole per mole of the unsaturated compound and, in the case of reaction mixtures incorporating aromatic compounds, in an amount of at least 0.5 mole per mole of said aromatic compound.

3. A process for the amidation of unsaturated compounds, which comprises exposing a mixture of formamide, and an unsaturated compound to ultraviolet irradiation, said mixture being substantially free of peroxide catalyst and containing from 1 to 200 moles of formamide per mole of unsaturated compound, and the unsaturated compound being:

(a) a mono-olefinically unsaturated cyclic compound having the formula

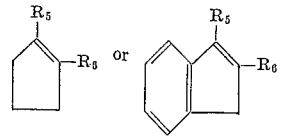

wherein $R_5$ is hydrogen or methyl, and $R_6$ is hydrogen or alkyl having from 1 to 4 carbon atoms;

(b) a di-olefinically unsaturated cyclic compound having the formula

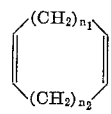

wherein $n_1$ and $n_2$ are each 0, 1 or 2;

(c) a mono-olefinically unsaturated acyclic compound having the formula $RR_1C=CR_2R_3$, wherein $R$, $R_1$, $R_2$ and $R_3$ are each hydrogen, alkyl having from 1 to 10 carbon atoms, or aryl, or one of which substituents is —COOH, —COOR$_4$, or —CONH$_2$, $R_4$ being alkyl having from 1 to 4 carbon atoms, and the remaining substituents being hydrogen or alkyl, as aforesaid, or in which $R_2$ and $R_3$ may together form part of a 6-membered ring;

(d) vinylcyclohexene;

(e) norbornene; or (f) an aromatic compound having the formula

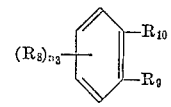

wherein $R_8$ is hydrogen or alkyl having from 1 to 4 carbon atoms; $R_9$ and $R_{10}$ are each hydrogen or parts of a benzene ring, and $n_3$ is an integer of from 1 to 4.

4. The process as defined in claim 3, in which the formamide and the olefinically unsaturated compound are reacted in admixture with an acetone, benzophenone, acetophenone, or benzaldehyde photosensitizer, said photosensitizer being incorporated in the mixture in an amount of at least 0.1 mole per mole of the unsaturated compounds of groups (a) to (e), inclusive, and in an amount of at least 0.5 mole per mole of the aromatic compounds of group (f).

5. A process for the amidation of unsaturated compounds, which comprises exposing a mixture of formamide and a mono-olefinically unsaturated acylic compound to ultraviolet irradiation, said mixture being substantially free of peroxide catalyst and containing 3 to 18 moles of formamide per mole of the acyclic compound and said acyclic compound having the formula $RR_1C=CR_2R_3$, wherein $R$, $R_1$, $R_2$ and $R_3$ are each hydrogen, alkyl having from 1 to 10 carbon atoms, or aryl; or one of which substituents is —COOH, —COOR$_4$, or —CONH$_2$, $R_4$ being alkyl having from 1 to 4 carbon atoms, and the remaining substituents being hydrogen or alkyl, as aforesaid; or in which $R_2$ and $R_3$ may together form part of a 6-membered ring; and maintaining said mixture during at least a portion of the irradiation, in an inert atmosphere.

6. A process for the amidation of unsaturated compounds, which comprises exposing a mixture of formamide and a mono-olefinically unsaturated cyclic compound to ultraviolet irradiation, said mixture being substantially free of peroxide catalyst and containing from 3 to 18 moles of formamide per mole of the cyclic compound, and said cyclic compound having the formula:

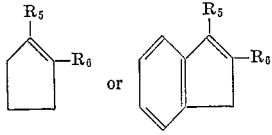

wherein $R_5$ is hydrogen or methyl, $R_6$ is hydrogen or alkyl having from 1 to 4 carbon atoms; and maintaining said mixture during at least a portion of the irradiation, in an inert atmosphere.

7. A process for the amidation of unsaturated compounds, which comprises exposing a mixture of formamide and a di-olefinically unsaturated cyclic compound to ultraviolet irradiation, said mixture being substantially free of peroxide catalyst and containing 3 to 18 moles of formamide per mole of the cyclic compound, said cyclic compound having the formula:

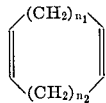

wherein $n_1$ and $n_2$ are each 0, 1 or 2; and maintaining said mixture during at least a portion of the irradiation, in an inert atmosphere.

8. A process for the amidation of unsaturated compounds, which comprises exposing a mixture of formamide and vinylcyclohexene to ultraviolet irradiation, said mixture being substantially free of peroxide catalyst and containing from 3 to 18 moles of formamide per mole of vinylcyclohexene; and maintaining the mixture, during at least a portion of the irradiation, in an inert atmosphere.

9. A process for the amidation of unsaturated compounds, which comprises exposing a mixture of formamide and norbornene to ultraviolet irradiation, said mixture being substantially free of peroxide catalyst and containing from 3 to 18 moles of formamide per mole of norbornene; and maintaining the mixture, during at least a portion of the irradiation, in an inert atmosphere.

10. A process for the amidation of unsaturated compounds, which comprises exposing a mixture of formamide and an aromatic compound to ultraviolet irradiation, said mixture being substantially free of peroxide catalyst and containing from 3 to 18 moles of formamide per mole of the aromatic compound, and said aromatic compound having the formula

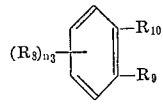

wherein $R_8$ is hydrogen or alkyl having from 1 to 4 carbon atoms; $R_9$ and $R_{10}$ are each hydrogen or parts of a benzene ring, and $n_3$ is an integer of from 1 to 4; and maintaining the mixture, during at least a portion of the irradiation, in an inert atmosphere.

No references cited.

JOHN H. MACK, Primary Examiner.

H. S. WILLIAMS, Examiner.